United States Patent [19]
Okonogi et al.

[11] Patent Number: 4,791,193
[45] Date of Patent: Dec. 13, 1988

[54] PROCESS FOR PRODUCING BOVINE LACTOFERRIN IN HIGH PURITY

[75] Inventors: Shigeo Okonogi, Tokyo; Mamoru Tomita, Yokohama; Toshio Tomimura, Chiba; Yoshitaka Tamura, Yokohama; Teruhiko Mizota, Tokyo, all of Japan

[73] Assignee: Morinaga Milk Industry Co., Ltd., Tokyo, Japan

[21] Appl. No.: 74,034

[22] Filed: Jul. 16, 1987

[30] Foreign Application Priority Data

Jul. 17, 1986 [JP] Japan ................. 61-168478

[51] Int. Cl.$^4$ .............................. A23J 1/20
[52] U.S. Cl. .................... 530/416; 426/657; 530/365; 530/366; 530/832; 530/833
[58] Field of Search ............... 530/366, 365, 837, 833; 424/85

[56] References Cited

U.S. PATENT DOCUMENTS

| | | | |
|---|---|---|---|
| 3,234,199 | 2/1966 | Reid | 530/366 X |
| 4,100,149 | 7/1978 | Meiller et al. | 530/367 X |
| 4,229,342 | 10/1980 | Mirabel | 530/416 X |
| 4,352,828 | 10/1982 | Rialland et al. | 530/366 X |
| 4,436,658 | 3/1984 | Peyrouset et al. | 530/832 X |
| 4,668,771 | 5/1987 | Kawakami et al. | 424/85 X |

OTHER PUBLICATIONS

J. Biol. Chem. 228, 767–777 (1957), Morrison et al.
Biochim. Biophys. Acta 60 (1962), 410–411, Gordon et al.
J. Am. Chem. Soc. 82 (1960), 3345–3350 (Groves).
Biochim. Biophys. Acta. 100 (1965), 154–162, Groves.
Acta Chem. Scand. 23 (1969), 683–684, Johansson.

Primary Examiner—Howard E. Schain
Attorney, Agent, or Firm—Oblon, Fisher, Spivak, McClelland & Maier

[57] ABSTRACT

A process for producing bovine lactoferrin in high purity form raw milk-materials containing skim milk or whey originated form cow's milk which comprises: adsoption step wherein said raw materials are contacted, at a temperature between 0°–60° C., with weakly acidic cation-exchanger which includes carboxymethyl groups as ion exchanging groups and has haemoglobin adsorption property more than 3.5 g/100 ml; rinsing step wherein said exchanger is washed with water to remove substances other than those adsorbed to said exchanger; and desorption step wherein the substances adsorbed to said exchanger are desorbed therefrom with a solution of one or more of salts to thereby yield highly purified bovine lactoferrin without deterirating raw milk materials. Said desorption step can be carried out in a single stage to produce lactoferrin more than 80% purity to total proteins recovered, and in two stage to attain more than 98% purity.

5 Claims, 1 Drawing Sheet

PROCESS FOR PRODUCING BOVINE LACTOFERRIN IN HIGH PURITY

TECHNICAL FIELD

This invention relates to a process for producing bovine lactoferrin in high purity.

BACKGROUND

Lactoferrin is known as an iron-binding protein occurring in external secretions such as milk, saliva and the like. It has been known that lactoferrin bears an important function in dietetic view point to transfer iron and that lactoferrin possesses bacteriostatic effect, due to its iron-binding property, against pathogenic bacteria which have higher iron-requiring property. Thus lactoferrin is one of the important milk proteins as a nutrient and also as an infection defensive substance for human infants and calves along with immunoglobulins and lysozymes. Lactoferin occurs in milk in two forms, iron-binding and iron-free forms. Though colostrum contains relatively much lactoferrin, but normal milk contains only a minor amount, for example, 1 liter of cow's milk contains only 250 mg of lactoferrin.

In spite of the useful physiological functions of lactoferrin, it has been difficult to isolate and purify lactoferrin from milk in industrial scale because of its minor proportion in milk.

Many attempts have been made to develop a process for producing lactoferrin some of which are enumerated hereunder.

A process has been proposed wherein casein or whey fraction obtained by precipitation of cow's skim milk at isoelectric point of pH 4.6 is subjected to ammonium sulfate fractionation, subsequently a specific fraction obtained is subjected to column fractionation using several kinds of ion-exchangers to thereby purify bovine lactoferrin (see: M. L. Groves, J. Am. Chem. Soc., Vol. 82, p.p. 3345–3350, 1960; M. L. Groves, Biochem. Biophys. Acta., Vol. 100, p.p. 154–162, 1965).

It has been also proposed that in the process of purification of lactoperoxidase, rennet whey which is adjusted to pH 7.0 is subjected to adsorption with weakly acidic cation-exchanger, the substances adsorbed to said exchanger are desorbed with desorbing fluid, the resulted fluid is subjected to ammonium sulfate fractionation, then a specific fraction obtained is subjected to column fractionation with calcium phosphate or with weakly acidic cation-exchanger during which step lactoferrin contained as an contaminant is fractionated as a by-product (see: M. Morrison et al, J. Biol. Chem., Vol. 228, p.p. 767–776, 1957; W. G. Gordon et al, Bichem. Biophys. Acta., Vol. 60, p.p. 410–411, 1962).

A process has been proposed wherein human breast milk is subjected to ammonium sulfate fractionation, to the resulted supernatant fraction ferric ammonium sulfate is added and then the resulted fluid mixture is subjected to column fractionation with weakly acidic cation-exchanger to thereby purify lactoferrin (P. Querinjean et al, Uer. J. Biochem, Vol. 20, p.p. 420–425, 1971).

A process has been proposed wherein human breast milk is diluted three fold with water containing ferric ammonium sulfate and then the resulted fluid mixture is subjected to column fractionation with weakly acidic cation-exchanger to thereby purify lactoferrin (B. G. Johansson, Acta Chem. Scand., Vol. 23, p.p. 683–684, 1969).

Also affinity chromatography method utilizing fixed monoclonal anti bovine lactoferrin antibody has been known (see: Unexamined Japanese patent application Gazette No. 61(1986)-145200).

Conventional methods, however, are unsatisfactory as the methods for industrial mass production of lactoferrin due to their low efficiencies.

Moreover, the conventional methods may inevitably deteriorate a large quantity of raw milk-materials, since they involve addition of one or more of substances to the raw materials during their processes, for example, addition of ammonium sulfate for fractionation, addition of iron containing fluid for modifying lactoferrin to iron-binding form, and addition of pH adjusting fluid and so on. Furthermore, in purification of lactoferrin, conventional methods were not simple owing to utilization of several kinds of exchangers, utilization of various desorbing conditions in column fractionation, utilization of ammonium sulfate fractionation and so on.

Application of the affinity chromatography method to industrial production of lactoferrin involves preparation of a large quantity of the antibody which entails a cost problem. Furthermore, the conditions of stability of the antibody is severely confined, and in fact it is very difficult to apply the method to industrial scale production.

Therefore, it is an object of the present invention to provide a new and useful process for producing bovine lactoferrin.

It is another object of the present invention to provide an improved process for producing lactoferrin in industrial scale without resulting notable changes to the composition and quality of the raw materials and without complicated procedures.

It is a further object of the present invention to provide a process for industrial production of bovine lactoferrin in high purity.

SUMMARY OF THE INVENTION

Pursuant to the present invention, a process is disclosed for producing bovine lactoferrin in high purity with a simple process and without deteriorating raw milk-materials. The process includes three basic steps: adsorption sgtep wherein said raw milk-materials is contacted with a specific kind of weakly acidic cation-exchangers to thereby lactoferrin is preferentially adsorbed; rinsing step wherein said exchanger is washed with water to remove substances other than adsorbed to said exchanger; and desorption step wherein substances adsorbed to said exchanger are desorbed with solution of one or more of salts to thereby yield lactoferrin in high purity.

An additional step can be utilized prior to the desorption step in the basic process. In the additional step, said exchanger after rinsing is subjected to washing with a relatively weak solution of one or more of salts. When the additional step is incorporated into the basic process, the desorption step in the basic process is carried out utilizing a relatively strong solution of one or more of salts.

It is important to utilize weakly acidic cation exchanger which includes carboxymethyl groups as ion exchanging groups and has haemoglobin adsorption property equal to or more than 3.5 g/100 ml. The criterion of haemoglobin adsorption property used in this specification will be explained hereinafter.

It is preferable to utilize so called "hard type" of weakly acidic cation-exchanger having a volume variation ratio equal to or less than 1.5, especially when the process is carried out as a continuous process. The definition of the terms "volume variation ratio" used in this specification is the value which is given by the bed volume of the Na form of said exchanger swelled with water (in a column) devided by the bed volume of same equlibrated with sodium chloride solution having 0.5 ionic strength.

It is also preferable that adsorption step is carried out at a temperature between 0°–60° C.

As a desorbing fluid, a solution of one or more of salts selected from the group consisting of sodium chloride, potasium chloride, calcium chloride and magnesium chloride can be utilized.

When the additional step is utilized, the concentration of the relatively weak solution is selected within a range of 0.4–2.5 wt% and the concentration of the relatively strong solution is selected within a range of 1.5–12 wt.%.

DESCRIPTION OF THE PREFERRED EMBODIMENT

Figure 1:
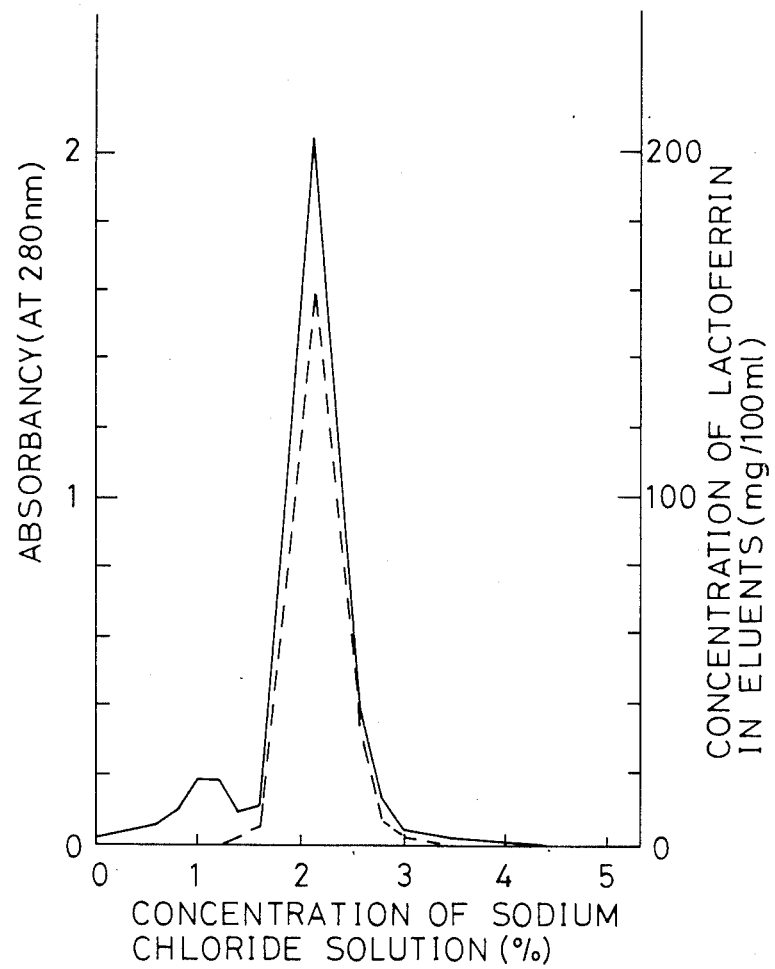
FIG. 1 is a graph showing absobancy at 280 nm (solid line) and lactoferrin concentration per 100 ml (dotted line) of the fractionated solutions which are recovered, from exchanger after rinsing step, by stepwise elution with sodium chloride solutions having different concentrations.

The present invention has particular utility for producing highly purified bovine lactoferrin in industrial scale.

For the purposes of this invention skim milk and whey which include lactoferrin and are originated from cow's milk are used as raw materials. Either of acid and sweet wheys can be used. Hereinafter these materials will be referred to as raw milk-materials. Preferablly raw milk-materials are used without sterilization (by heating), since bovine lactoferrin tend to be denaturated since lactoferrin is rather sensitive to heating.

It is said that the isoelectric point of lactoferrin is 7.8, and lactoferrin is positively charged when pH of raw milk-materials is lower than 7.8. In other words, lactoferrin is positively charged in any of skim milk of pH 6.7, sweet whey of pH 6.4 and acid whey of pH 4.6. Furthermore, lactoferrin is positively and more strongly charged as pH of raw milk-materials decreases. On the other hand isoelectric points of most of other proteins contained in raw milk-materials are approximately 5 which are lower than that of lactoferrin. Therefore most of proteins othere than lactoferrin are negatively charged at the pH range of skim milk and sweet whey, and they are placed in isoelectric point or positively but weakly charged at the pH range of acid whey.

The present invention aims to utilize the difference of electrifying property of proteins for isolation of lactoferrin. In other words, in the present invention, lactoferrin is preferentially adsorbed to ion-exchanger utilizing the deference of signs (positive or negative) or magnitude of the electrification of charged proteins. Consequently it is essential to utilize cation-exchanger in this invention.

Lactoferrin is a protein having the molecular weight of about 80,000 dalton and a very big molecular size. In order to carry out the present invention in industrial scale, it is necessary to use porous cation-exchanger so that molecules of lactoferrin may freely enter into the porous structure thereof and a large quantity of lactoferrin can be adsorbed thereto.

As an index of porosity of exchanger, adsorption property of exchanger for haemoglobin which is typical protein having a large molecular weight can be used. In this specification, adsorption property for haemoglobin is determined as explained hereunder.

Dissolving 400 mg of haemoglobin into 0.05M citric acid buffer solution containing sodium citrate and adjusted to pH 5.0, 100 ml of haemoglobin solution was prepared. To the haemoglobin solution, 2 ml of the Na form of cation-exchanger swelled with water and equilibrated with same buffer solution was added. After 2 hours stirring at 25° C., said exchanger was collected and washed with the buffer solution to collect haemoglobin which was not adsorbed to said exchanger. Total quantity of haemoglobin which was not adsorbed to said exchanger, i.e. the quantity of haemoglobin collected by washing and that remained in haemoglobin solution was measured, thereby quantity of haemoglobin adsorbed to said exchanger was calculated. Resulted value is used in this specification as haemoglobin adsorption property per 100 ml of the Na form of swelled cation-exchanger.

Test 1

The purpose of this test is to exemplify the optimum exchanger to be utilized in this invention.

Ten kinds of available cation-exchangers used in this test is shown in Table 1. Each of the exchangers were preliminarily converted to the Na form and swelled with water. To each 1 kg of raw skim milk (pH 6.7), 10 ml of each of exchangers was respectively added. After 16 hours stirring of the mixture at 4° C., each of said exchangers were collected and rinsed respectively to remove unadsorbed substances. Each of rinsed exchangers was treated with 150 ml of 10% sodium chloride sulution, the substances adsorbed to said exchanger were desorbed and recovered in the solution. The lactoferrin content in the recovered sodium chloride solution was measured by Laurell's method (C-B. Laurell, Anal. Biochem., Vol. 15, p. 45, 1966). The results are shown in Table 1. The pH values of respective skim milk after adsorption step are also shown in Table 1.

TABLE 1

| | Experiment No. | | | |
|---|---|---|---|---|
| | 1 | 2 | 3 | 4 |
| exchanger resin*[1] | AMBERLITE 120B | DIAION WK-11 | DIAION WK-10 | P-CELLULOSE |
| maker | Organo | Mitsubishi Kasei | Mitsubishi Kasei | Celba |
| ion exchanging gp. | sulfonic acid | methacrylic acid | methacrylic acid | phosphoric acid |
| exchange capacity | 190 meq/100 ml | 320 meq/100 ml | 270 meq/100 ml | 12 meq/100 ml |
| haem. adsorpt.*[2] | 1.8 g/100 ml | 2.6 g/100 ml | 2.5 g/100 ml | 3.4 g/100 ml |
| lactofer. yielded | <2 mg | 14 mg | 38 mg | <2 mg |
| lactofer. purity*[3] | — | 36 | 35 | — |
| ph of skim milk*[4] | 6.8 | 6.8 | 6.8 | 6.7 |

TABLE 1-continued

| | Experiment No. | | |
|---|---|---|---|
| | 5 | 6 | 7 |
| exchanger resin*[1] | CM-SEPHADEX C-25 | CM-CELLULOSE | CM-TOYOPEARL 650M |
| maker | Pharmacia | Broun | Toyo Soda |
| ion exchanging gp. | carboxymethyl | carboxymethyl | carboxymethyl |
| exchange capacity | 52 meq/100 ml | 8 meq/100 ml | 10 meq/100 ml |
| haem. adsorpt.*[2] | 2.3 g/100 ml | 2.3 g/100 ml | 4.7 g/100 ml |
| lactofer. yielded | 4 mg | 6 mg | 58 mg |
| lactofer. purity*[3] | 25 | 24 wt. % | 92 wt. % |
| ph of skim milk*[4] | 6.7 | 6.7 | 6.7 |

| | Experiment No. | | |
|---|---|---|---|
| | 8 | 9 | 10 |
| exchanger resin*[1] | CM-SEPHALOSE FF | SEPABEADS FP-CM13 | CM-SEPHADEX C-50 |
| maker | Pharmacia | Mitsubishi Kasei | Pharmacia |
| ion exchanging gp. | carboxymethyl | carboxymethyl | carboxymethyl |
| exchange capacity | 12 meq/100 ml | 14 meq/100 ml | 10 meq/100 ml |
| haem. adsorpt.*[2] | 6.1 g/100 ml | 4.5 g/100 ml | 3.9 g/100 ml |
| lactofer. yielded | 57 mg | 85 mg | 91 mg |
| lactofer. purity*[3] | 95 wt. % | 97 wt. % | 96 wt. % |
| ph of skim milk*[4] | 6.7 | 6.7 | 6.7 |

*[1] trade name
*[2] haemoglobin adsoption property
*[3] purity of lactoferrin to total protein
*[4] pH of skim milk after adsorption step Furthermore, proportions (%) of lactoferrin to total proteins included in the respective recovered solution can be obtained as approximate values from the absorbancy ratio at 280 nm of lactoferrin to that of total proteins (based on the absobancy which is 12.7 at 280 nm for 1% solution of pure lactoferrin). Resulted values are also shown in Table 1. The method of measuring concentration of protein utilizing absorbancy at 280 nm is widely adopted. In fact the value calculated as absorbancy ratio (%) was almost equal to the proportion of lactoferrin obtained by Laurell's method to the total proteins, since the proportion of lactoferrin to total protein in the recovered solution was very high (e.g. see Example 2 and 8).

As will be seen from Table 1, weakly acidic cation-exchangers (Experiment No. 7–10) which have carboxymethyl groups as ion-exchanging groups and haemoglobin adsorbing property of 3.5 g/100 ml gave good yields of lactoferrin and high purity over 90%. In contrast, weakly acidic cation-exchangers (Experiment No. 1–4) having ion-exchanging groups other than carboxymethyl groups gave poor yields of lactoferrin and very low purity. It will be also noted that even if weakly acidic cation-exchangers have carboxymethyl groups as ion-exchanging groups, if their haemoglobin adsorption property is lower than 3.5 g/100 ml (Experiment No. 5-6), then yields and purity of lactoferrin were very low. From the resuts of this test it was concluded that aforesaid two conditions are essential.

It was also confirmed that there was almost no change in pH values of skim milk after adsorption and that there was no change in appearance, taste and flavour in Experiments No. 7-10.

Test 2

The purpose of this test is to exemplify applicable counter ions for weakly acidic cation-exchangers to be utilized in the present invention.

Five lots of exchanger each contains 30 ml of CM-Sepharose FF (by Pharmacia) which was found proper to be utilized in this invention in Test 1 were prepared. The exchanger in respective lots was treated with 500 g each of ion substituting solutions shown in table 2, and then rinsed respectively to obtain several samples of the exchanger having different counter ions. To 5 lots of raw materials each consisting of 1 kg of skim milk solution, each of said exchanger samples was added respectively. After 16 hours stirring at 4° C., each of said exchanger samples was collected from raw materials and rinsed, then subjected to desorption step using 300 ml of 10% sodium chloride solution to recover the substances adsorbed to said exchanger. Yields and purities of lactoferrin included in the recovered solutions and pH values of skim milk solutions after adsorption step are shown in Table 2.

TABLE 2

| | Experiment No. | | | | |
|---|---|---|---|---|---|
| | 11 | 12 | 13 | 14 | 15 |
| (counter Ion form) | (II) | (Na) | (K) | (Ca) | (Mg) |
| solution for Ion substitution | 0.8% HCl | 10% NaCl | 12.4% KCl | 12.2% CaCl2.2H2O | 16.2% MgCl2.6H2O |
| lactofer. yield*[1] | 123 mg | 111 mg | 98 mg | 108 mg | 102 mg |
| lactofer. purity*[2] | 89 wt. % | 87 wt. % | 87 wt. % | 92 wt. % | 91 wt. % |
| pH of skim mild*[3] | 6.6 | 6.7 | 6.7 | 6.7 | 6.7 |

*[1] lactoferrin yield
*[2] purity of lactoferrin to total proteins recovered
*[3] pH of skim milk after adsorption step As will be seen from Table 2, regardless of the kinds of counter ions used, good yields over 90 mg and good purities over 80% of lactoferrin to total proteins are attained. There was no notable changes in pH values, appearance, taste and flavour of skim milk solutions after adsorption step.

From this test, it was concluded that any of counter ions, H, Na, K, Ca and Mg can be used as counter ions for weakly acidic cation-exchangers in this invention.

Now it has been exemplified that highly purified lactoferrin can be produced in accordance with the process of the present invention.

Test 3

The purpose of this test if to exemplify the advisability of an additional step wherein rinsed exchanger is washed with a relatively weak solution of one or more of salts selected from the group consisting of sodium chloride, potassium chloride, calcium chloride and magnesium chloride to remove the adsorbed contaminants.

Preparation of the Na form of cation-exchanger was such that 0.4 g of CM-Sephadex C 50 (by Pharmacia) which included carboxymethyl groups as ion exchanging groups and had haemoglobin adsobing property of 3.9 g/100 ml was swelled with water.

To 2.0 kg of raw skim milk (pH 6.7) originated from cow's milk, 18 ml of said swelled exchanger was added. After stirring the resulted mixture for 16 hours at 4° C., said exchanger was collected by cloth filter and packed into a column and rinsed with water to remove substances which were not adsorbed to the exchanger. Each of 50 ml of sodium chloride solutions having different concentrations shown under the abscissa in FIG. 1 was stepwisely passed through said column in increasng order to concentrations to elute every fractions. Absorbancies at 280 nm and concentrations of lactoferrin of every fractions were measured. The results are shown in FIG. 1.

From the curve of absorbancy in FIG. 1, it will be found that proteins desorbed from said exchanger are fractionated into two fractions as the concentration of sodium chloride increases. It was assumed that the majority of proteins contained in the first fraction obtainable under lower concentrations was ones other than lactoferrin and that the majority of proteins contained in the second fraction obtainable under higher concentrations was lactoferrin. The boundary of concentration which may separate the two fractions was found between 1.4–1.6%.

From the results of this test, it was suggested that lactoferrin in higher purity could be yielded if exchanger is treated with relatively weak solution to desorb contaminant protein, and then treated with relatively strong solution to desorb the majority of lactoferrin.

Test 4

The purpose of this test is to exemplify that the assumption is correct.

To 2.0 kg of raw skim milk originated from cow's milk, 0.4 g of the Na form of CM-Sephadex swelled as in Test 3 was added. After stirring for 16 hours at 4° C., the exchanger was collected using cloth filter and packed into a column. After rinsing the column to remove substances which were not adsorbed to said exchanger, 100 ml of 1.6% sodium chloride solution was passed through said column to remove a first fraction and then 100 ml of 5% sodium chloride solution was passed through said column to obtain a second fraction. The concentration of lactoferrin in the second fraction was 176 mg/100 ml by Laurell's method and absorbancy at 280 nm was 2.25. Thus 176 mg of lactoferrin was yielded and the purity of lactoferrin was 99% which was calculated from absorbancy at 280 nm (176×0.0127×100/2.25).

From the results of the forgoing tests it was confirmed that the additional step of desoption with relatively weak salt solution is preferable to increase purity of lactoferrin to be yielded.

It will be understood that highly purified lactoferrin can be produced by the process of this invention.

It will be understood that purity of lactoferrin can be further increased by a modification of the process wherein an additional step is incorporated.

It will be apparent to those skilled in the art from the foregoings that one or more of salts selected from the group consisting of sodium chloride, potassium chloride, calcium chloride, and magnesium chloride can be utilized for the relatively weak solution in the additional step.

It will be apparent from the foregoings that one or more of salts selected from the same group can be utilized for the relatively strong solution to be used in desorbing step after the additional step. Though the range of concentrations for these solutions may vary depending upon the salts to be used, approximate range for the weak soluion is 0.4–2.5 and for the strong solution 1.5–12.

It will be also apparent that the adsoption step can be carried out batchwisely or continuously. In the former case, vessels with stirrer can be utilized, and in the latter case, columns can be utilized. In either cases, it is important that raw milk-materials can be sufficiently contacted with ion-exchanger.

Volume ratio of raw milk-materials to ion exchanger in batchwise process can be adjusted depending upon the adsorbing property of the exchanger to be used and desired efficiency of the process, e.g., when better yield per a certain quantity of raw milk-materials is desired, said ratio should be decreased, and when better yield per a certain quantity of exchanger is required, said ratio should be increased. Volume of exchanger to be packed in a column in continuous process can also be adjusted depending upon the adsobing property of exchanger to be used and desired efficiency of the process.

The temperature at which the adsorption step is carried out should be limited within a range of 0°–60° C., since lactoferrin tend to denaturalized at temperatures over 60° C. When raw milk-materials which are neither sterilized nor pasturized are used, the adsorption step is desirably carried out between 0°–10° C.

The period of time during which raw milk-materials are contacted with exchanger can be properly selected paying consideration to the processing temperature, type of systems to be utilized (batchwize or continuous) and so on.

As previously mentioned, it is preferable to use so called "hard type" of exchanger, especially the present process is continuously carried out utilizing columns. The reason is that so called "soft type" of exchanger likly to change its volume depending upon ionic strength, pH and the like and readily be compressed when a liquid is passed through the column in a higher flow rate. This may lead large pressure loss, especially raw milk-materials are passed through the column.

Preparation of swelled exchanger, for example the Na form of exchanger, is such that, the Na form of dried exchanger can simply be swelled with water. If the exchanger is not Na form, it can be converted into the Na form by treatment with 10% solution of sodium chloride, followed by rinsing. This rinsing procedure must be made untill chloride ion cannot be detected.

Among the exchangers enumerated in Table 1, CM-TOYOPEARL 650M, CM-SEPHAROSE FF and SEPABEADS FP-CM13 are classifyed into hard type which have same volume variation ratio, 1.0. CM-SEPHADEX C-50 is clasiifyed into soft type volume variation ratio of which is 3.0.

It should be noted that only a single stage of desorption step is sufficient when the process is carried out in accordance with the basic process of this invention and that only two stages of desorption step, one is for desoption of contaminat protein and the other is for desoption of lactoferrin, are sufficient when the additional step is incorporated.

Demineralization and dehydration for recovered solution can be carried out by the conventional methods, for example, demineralization can be carried out by ultrafiltration, electrodialysis and any other dialytic methods until salts are removed to the desired extent and dehydration can be carried out by freezedrying and spray drying.

Now preferred embodiments will be described hereunder.

EXAMPLE 1

Packing 500 ml of CM-TOYOPEARL 650C (by TOYOH SOHDA) was packed in a column of 10 cm diameter, passing therethrough 2 l of 10 wt.% sodium chloride solution, and then rinsing with distilled water, a column of the Na form of said exchanger was prepared. The characteristics of the exchanger were as follow:
  ion exchanging groups: carboxymethyl groups
  haemoglobin adsorption property: 4.6 g/100 ml
  volume variation ratio: 1.0

Through said column, 60 l of raw skim milk originated from cow's milk, pH 6.7, was passed at 4° C., 4 l/h. There was no change in pH value, appearance, taste and flavour of the skim milk after the adsorption step. After rinsing the column to remove skim milk, 5 l of 10% sodium chloride solution was passed through said column at 5 l/h to desorb substances which were adsorbed to said exchanger, to thereby recover 5.0 l of the solution containing the desorbed substances. During the forgoing procedures, no change in bed volume was observed.

The concentration of lactoferrin in the recovered solutiuon was 36 mg/100 ml, and absobancy at 280 nm was 0.497. A yield of 1800 mg of lactoferrin was attained, and its purity was calculated as approximately 92% ($36 \times 0.0127 \times 100/0.497$).

EXAMPLE 2

Packing 1 l of CM-SEPHAROSE FF (by PHARMACIA) into a column, conducting 2 l of 0.1N HCl solution into the column, and then rinsing said exchanger, the H form of said cation exchanger was prepared. The characteristics of the exchanger were as follows:
  ion exchanging groups: carboxymethyl groups
  haemoglobin adsorption property: 6.1 g/100 ml
  volume variation ratio: 1.0

The H form of said exchanger was collected and added into 100 l of raw skim milk (pH 6.7) originated from cow's milk to treat skim milk batchwisely at 4° C. for 6 hours. Following this adsoption step, exchanger was collected by cloth filter. The pH value of the skim milk after adsorption step was 6.7, and there was no change in pH, appearance, taste and flavour.

The collected exchanger was repacked into a column, and subjected to rinsing to remove skim milk. At a flow rate of 5 l/h, 5 l of 10% sodium chloride solution was passed through the column, thereby 5.0 l of the solution containing desorbed substances was recovered. During the foregoing procedures, there was observed no change in bed volume. The concentration of lactoferrin in the recovered solution was 110 mg/100 ml, absorbancy at 280 nm was 1.47. A yield of 5500 mg lactoferrin in the recovered solution was attained, and its purity was approximately calculated as 95% ($110 \times 0.0127 \times 100/1.47$).

Using ultrafiltration module (type labo-20, by DDS) installed an ultrafiltration membrain GR61PP (by DDS) having fractionating molecular weight of 20,000, 4.9 l of the recovered solution was subjected to ultrafiltration under circulatin ratio of 8 l/min., mean pressure of 3 kg/cm$^2$, the filtrate was then subjected to diafiltration for demineralization. The condensed demineralized solution was freeze dried to thereby yield 4.1 g of lactoferrin. Composition of this dried product was such that: 3.2% moisture; 0.3% ash; 92% lactoferrin. The ratio of lactoferrin occupied in total proteins contained in the product was 95% which agreed with the value approximately calcalated from absorbancy ratio at 280 nm ($92 \times 100/(100-3.2-0.3)$).

EXAMPLE 3

Pasteurizing cow's milk adjusted to 3.0% fat contents at 75° C. for 15 sec., thereafter cooling to 30° C., 100 kg of pasteurized milk was obtained. To this pasteurized milk, solution of calcium chloride prepared by dissolving 5 g of calcium chloride into 50 ml of water and 1 l of starter (*Streptococcus lactis*) were added. To this mixture, 2 g of rennet dissolved into 500 ml of water was added. The resulted coagulation was subjected to cutting and cooking procedures to thereby obtain whey. The resulted whey was pasteurized at 75° C. for 15 seconds to thereby obtain pasteurized cheese whey, pH 6.5, 19 mg/100 ml lactoferrin consentration. Swelling 2.5 g of CM-SEPHADEX C-50 (by PHARMACIA) with water, 113 ml of swelled exchanger (Na form) was prepared. The characteristics of the exchanger were as follow:
  ion exchanging groups: carboxymethyl groups
  haemoglobin adsorption property: 3.9 g/100 ml
  volume variation ratio: 3.0

To 50 kg of the cheese whey, 113 ml of said swelled exchanger was added. After 16 hours stirring at 4° C., said exchanger was collected with cloth filter. The pH value of the cheese whey after adsorption step was 6.4 (unchanged) and no change in appearance, taste and flavour was observed.

The collected exchanger was packed into a column, then subjected to rinsing to remove whey. The rinsed exchanger was subjected to desorption step wherein 500 ml of 0.5N potassium chloride solution adjusted to pH 8.0 wth 0.05M citric acid buffer containing sodium citrate was added to thereby recover 550 ml of the solution containing desorbed substances. The consentration of lactoferrin in the recovered solution was 235 mg/100 ml, and the absorbancy at 280 nm was 3.19. A yield of 1290 mg of lactoferrin was attained, purity of lactoferrin in total proteins was 94% which agreed with the value approximately calculated from absobancy ratio at 280 nm ($235 \times 0.0127 \times 100/3.19$).

EXAMPLE 4

Sterilizing cow's milk, adjusted to 3.0% fat contents, at 75° C. for 15 sec., then cooling to 30° C., 100 kg of sterilized milk was obtained. To the sterilized milk, calcium chloride solution prepared by dissolving 5 g of calcium chloride into 50 ml of water and 1 l of starter (*Streptococcus lactis*) were added. To this mixture, 2 g of rennet dissolved into 500 ml of water was added. The resulted coagulation was subjected to cutting and cooking procedures to thereby obtain whey. The supernatant fluid of resulted whey was sterilised at 75° C. for 15 sec to thereby obtain sterilized cheese whey, pH 6.4, 19 mg/100 ml lactoferrin concentration. Treating 2.5 g of CM-SEPHADEX C-50 (by PHARMACIA) with sodium chloride solution, then swelled with water, 113 l of the Na form of said exchanger was prepared. The characteristics of the exchanger were as follow:

ion exchanging group: carboxymethyl groups
haemoglobin adsorption property: 3.9 g/100 ml
volume variation ratio: 3.0

To 50 kg of the cheese whey, 113 ml of the prepared exchanger was added. After 16 hours stirring at 4° C., said exchanger was collected with cloth filter. The pH value of the cheese whey after adsorption step was 6.4 (unchanged) and no change in appearance, taste and flavour was observed.

The collected exchanger was repacked into a column, then subjected to rinsing to remove whey. The bed volume at this time was 87 ml, and volume variation ratio 1.3 (113/87). The rinsed exchanger was subjected to desorption step, with 500 ml of 10% sodium chloride solution, 250 ml/h flow rate, to thereby recover 550 ml of the solution containing desorbed substances. The bed volume at this time was 24 ml and volume variation ratio of the bed volume was 4.7 (113/24). The concentration of lactoferrin in the recovered solution was 224 mg/100 ml, and the absorancy at 280 nm was 3.05. A yield of 1230 mg of lactoferrin was attained, purity of lactoferrin in total protein was 93% which agreed with approximately calculated absorancy ratio ($224 \times 0.0127 \times 100/3.05$).

EXAMPLE 5

Raw skim milk originated from cow's milk was elevated its temperature to 35° C., adjusted to pH 4.6 with dropping chloric acid, diluted 9 times, under stirring. The resulted curd was removed to obtain acid whey. The pH of the whey was 4.6, and lactferrin concentration was 26 mg/100 ml.

Packing 100 ml of SEPABEADS FP-CM13 (by MITSUBISHI KASEI) into a column, 200 ml of 0.1N HCl solution was passed therethrough and then rinsed, the H form of said exchanger was prepared. The characteristics of the exchangerwere as follow:

ion exchanging groups: carboxymethyl groups
haemoglobin adsorption property: 4.5 g/100 ml
volume variation ratio: 1.0

The resulted exchanger was added into 10 l of said acidic whey. After 16 hours stirring at 4° C., said exchanger was collected and repacked into a column. The pH of the acid whey after adsorption step was 4.7, and the change in pH was minor, and no change in appearance, taste and flavour was observed.

After rinsing the repacked exchanger to remove whey, 500 ml of 10% sodium chloride solution was passed through the column at 500 ml/h. flow rate to thereby recover 500 ml of solution containing desorbed substances. During the foregoing procedures, there was observed no change in bed volume. The recovered solution showed 280 mg/100 ml lactoferrin concentration, 3.78 absorbancy at 280 nm. A yield of 1400 mg of lactoferrin was attained, and its purity in total proteins was 94% which agreed with approximately calculated absorbancy ratio ($280 \times 0.0127 \times 100/3.78$).

EXAMPLE 6

Swelling 25 g of CM-SEPHADEX c-50 (by PHARMACIA) with water, 1130 ml of the Na form of said exchanger was obtained. The characteristics of the exchanger were as follow:

ion exchanging groups: carboxymethyl groups
haemoglobin adsorption property: 3.9 g/100 ml
volume variation ratio: 3.0

The obtaind exchanger was added to 100 kg of raw skim milk heated to 55° C., pH 6.7. After 1 hour stirring at the same temperature, said exchangre was collected by cloth filter. The pH of skim milk after adsorption step was unchanged 6.7, no change in appearance, taste and flavour was observed.

The collected exchanger was repacked into a column, then rinsed to remove remaining skim milk. The bed volume at this time was 800 ml, and volume variation ratio 1.4 (1130/800). Thereafter 7 l of 5% sodium chloride solution was passed through the column to desorb the adsorbed substances, thereby recovered 7.6 l of solution containing desorbed substances. The bed volume at this time was 340 ml, and volume variation ratio was 3.3 (1130/340). The recovered solution showed 130 mg/100 ml lactoferrin concentration, 1.97 absorbancy at 280 nm. A yield of lactoferrin of 9.9 g was attained, and its purity in total proteins was 84% which aggreed with the value approximately calculated from absorbancy ratio at 280 nm ($130 \times 0.0127 \times 100/1.97$).

EXAMPLE 7

Packing 1000 ml of SEPABEADS FP-CM13 (by MITSUBISHI KASEI) into a column, 10 cm diameter, 2 l of 12% potassium chloride solution was passed through the column, then rinsed, the K form of said exchanger was prepared. The characteristics of the exchanger were as follow:

ion exchanging groups: carboxymethyl groups
haemoglobin adsorbing property: 4.5 g/100 ml
volume variation ratio: 1.0

Subsequently thereafter 96 kg of raw skim milk originated from cow's milk, pH 6.7, was continuously passed through said column at 6 l/h flow rate, at 4° C. The pH of the skim milk after adsorption step was unchanged 6.7, and no change in appearance, taste and flavour was observed. Rinsing said column with water to remove skim milk, 20 l of 2.5% potassium chloride solution was passed through said column to remove contaminants adsorbed to said exchanger. Subsequently thereto 10 l of 12% potassium chloride solution was passed thrugh said column to desorb the adsorbed substances, thereby 10.0 l of solution was recovered. During the foregoing procedures, no volume variation was observed. The recovered solution showed 62 mg/100 ml lactoferrin concentration, 0.79 absorbancy at 280 nm. A yield 6.2 g of lactoferrin was attained, and its purity in total proteins was 99.7% ($62 \times 0.0127 \times 100/0.79$).

EXAMPLE 8

Swelling 2.5 g of CM-SEPHADEX C-50 (by PHARMACIA) with water, 113 ml of the Na form of said exchanger was prepared. The charactyeristics of said exchanger were as follow:
ion exchanging groups: carboxymethyl groups
haemoglobin adsorption property: 3.9 g
volume variation rate: 3.0

The obtained exchanger was added to 10 l of raw skim milk originated from cow's milk, pH 6.7. After 16 hours stirring at 4° C., said exchanger was collected by cloth filter. The pH of the skim milk after adsorption step was unchanged 6.7, and no change in appearance, taste and flavour was observed. The collected exchanger was packed into a column, then rinsed with water to remove skim milk. The bed volume at this time was 82 ml, and the volume variation ratio was 1.4 (113/82). Through said column, 2.0 l of 1.6% sodium chloride solution was passed to remove contaminants, then 1.0 l of 5.0% sodium chloride solution was passed through said column to desorb substances adsorbed to said exchanger, thereby 1.1 l of solution was recovered. The bed volume at this time was 35 ml, and volume variation ratio was 3.2 (113/35). The recovered solution showed 61 mg/100 ml lactoferrin concentration, 0.78 absorbancy at 280 nm. A yield of 670 mg lactoferrin was attained, and its purity in total proteins was 99.3% which agreed with the value approximately calculated from absorbancy ratio at 280 nm ($61 \times 0.0127 \times 100/0.78$).

The recovered solution was subjected to dialysis with a dialysis tube against deionized water to remove sodium chloride, then resulted solution was freeze dried, thereby 650 mg of dry product was obtained. The composition of the dry product was 2.9% moisture, 96.2% lactoferrin, 0.5% ash. The proportion of lactoferrin to total proteins in the product was 99.6% which was found to be almost equal to the value approximately calculated from absorbancy ratio ($96.2 \times 100/(100-2.9-0.5)$).

EXAMPLE 9

Packing 500 ml of CM-TOYOPEARL 650C into a column, 5 l of 2.0% magnesium chloride solution was passed therethrough, then rinsed, thereby the Mg form of said exchanger was prepared. The characteristics of the exchanger were as follows:
ion exchanging groups: carboxymethyl groups
haemoglobin adsorption property: 4.6 g/100 ml
volume variation ratio: 1.0

The resulted exchanger was added to 50 l of raw skim milk originated from cow's milk, pH 6.7. After 1 hour stirring at 55° C., said exchanger was collected by cloth filter. The pH of skim milk after adsorption step was unchanged 6.7, and any change in appearance, taste and flavour was observed.

The collected exchanger was repacked into a column, rinsed to remove skim milk, then 10 l of 0.55% magnesium chloride solution was passed through said column to remove contaminants, and finally 5 l of 2.0% magnesium chloride solution was passed through said column thereby 5.0 l of solution containing desorbed substances was recovered. During the forgoing prosedures no variation in bed volume was observed.

The recovered solution showed 45 mg/100 ml lactoferrin concentration, 0.58 absorbancy at 280 nm. A yield of 2250 mg lactoferrin was attained, and its purity in total protein was 98.5% which agreed with the value approximately calculated from absorbancy ratio at 280 nm ($45 \times 0.0127 \times 100/0.58$).

EXAMPLE 10

To the raw skim milk originated from cow's milk heated to 35° C., chloric acid, diluted 9 times, was dropped to adjust to pH 4.6 under stirring, then the resulted curd was removed, thereby acid whey was prepared. The acid whey showed pH 4.6, 25 mg/100 ml lactoferrin concentration. Adding water to 2.5 g of CM-SEPHADEX C-50 (by PHARMACIA) to prepare 113 ml of the Na form of said exchanger swelled. The characteristics of the exchanger were as follows:
ion exchanging groups: carboxymethyl groups
haemoglobim adsorbing property: 3.9 g/100 ml
volume variation ratio: 3.0

To the resulted mixture, chloric acid was added to prepare 0.1N solution, then rinsed, to thereby the H form of said exchanger was prepared. The bed volume at this time was 73 ml, and the volume variation ratio was 1.5 (113/73). The resulted exchanger was added to 10 l of said acid whey. After 16 hours stirring at 4° C., said exchanger was collected, and repacked into a column, then rinsed to remove remaining whey. The bed volume at this time was 39 ml, and volume variation ratio was 2.9 (113/39). After rinsing, 2 l of 0.6% calcium chloride solution was passed through said column to remove contaminants, then 1 l of 5.0% calcium chloride solution was passed through said column to desorb adsorbed substances thereby 1.0 l of solution containing desorbed substances was recovered. The bed volume at this time was largely reduced to 14 ml, and the volume variation ratio was 8.1 (113/14).

The recovered solution showed 61 mg/100 ml of lactoferrin concentration, and 0.78 of absobancy at 280 nm. A yield of 610 mg of lactoferrin was attained, and its purity in total proteins was 99.3% which agreed with the value approximately calculated from absorbancy ratio ($61 \times 0.0127 \times 100/0.78$).

EXAMPLE 11

The solution from which contaminat proteins were removed by passing 20 l of 2.5% potassium chloride solution through said column was obtained as in example 7. Through said column, 10 l of 5% sodium chloride solution was passed to desorb adsorbed substances thereby 10.0 l of solutio containing desorbed substances was recovered. The bed volume untill this step was unchanged. The recovered solution showed 65 mg/100 ml lactoferrin concentration, 0.83 absorbancy at 280 nm. A yield of 6.5 g lactoferrin was attained, and its purity to taotal proteins was 99.5% which agreed with the value approximately calculated from absobancy ratio ($66 \times 0.0127 \times 100/0.83$).

EFFECTS OF THE INVENTION

The effect achieved by this invention are as follows:
(1) Lactoferrin can be isolated without deteriorating raw milk-materials.
(2) Highly purified lactoferrin can be produced with a simple process.
(3) Raw milk-materials can be efficiently treated, and industrial production of lactoferrin was enabled.

What is claimed is:

1. A process for producing bovine lactoferrin in high purity from raw milk materials containing skim milk or whey originating from cow's milk, which comprises:
(a) contacting said raw materials with a weakly acidic cation exchange resin which contains as cation exchange groups carboxymethyl groups, and has a hemoglobin adsorbing property more than 3.5 g/100 ml, at a temperature of between 0° and 60° C. to thereby adsorb said lactoferrin on said resin;

(b) washing said ion exchange resin with water to remove substances other than those adsorbed on said cation exchange resin; and (c) desorbing said bovine lactoferrin from said cation exchange resin by washing said resin with a solution of at least one salt, to thereby yield purified bovine lactoferrin.

2. The process as claimed in claim 1, wherein said cation exchange resin has a volume variation ratio equal to or less than 1.5, which is the value that is given by the bed volume of Na form of said exchange resin swelled with water in a column divided by the bed volume of the same resin equilibrated with sodium chloride solution having 0.5 ionic strength.

3. The process as claimed in claim 1, which further comprises a step before said desorbing step, wherein said cation exchange resin is washed with a first 0.4–2.5 wt.% solution of one or more salts selected from the group consisting of sodium chloride, potassium chloride, calcium chloride and magnesium chloride, to thereby remove contaminants, and said desorbing step is carried out with a second 1.5–12 wt.% solution of one or more of said salts, and wherein the concentration of said salt is higher in said second solution than said first solution.

4. The process as claimed in claim 1 wherein the purity of the yielded bovine lactoferring is equal to or more than 80% of the total proteins desorbed from said exchanger.

5. The process as claimed in claim 3 wherein the purity of the yielded lactoferrin is equal to or more than 98% of the total proteins desorbed from said exchanger.

* * * * *